US012181816B2

(12) United States Patent
Kurimoto et al.

(10) Patent No.: US 12,181,816 B2
(45) Date of Patent: Dec. 31, 2024

(54) TRANSPORT ROLLER PAIR, FIXING DEVICE, AND IMAGE FORMING DEVICE

(71) Applicant: SHARP KABUSHIKI KAISHA, Osaka (JP)

(72) Inventors: Hideaki Kurimoto, Osaka (JP); Hideaki Kadowaki, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/221,594

(22) Filed: Jul. 13, 2023

(65) Prior Publication Data

US 2024/0019800 A1 Jan. 18, 2024

(30) Foreign Application Priority Data

Jul. 14, 2022 (JP) ................................ 2022-113146

(51) Int. Cl.
*G03G 15/20* (2006.01)
*B65H 29/12* (2006.01)

(52) U.S. Cl.
CPC ....... *G03G 15/2028* (2013.01); *B65H 29/125* (2013.01); *B65H 2404/14* (2013.01); *B65H 2404/53* (2013.01)

(58) Field of Classification Search
CPC ............... G03G 15/08; G03G 15/2028; G03G 21/1853; G03G 21/186; G03G 2215/0132
USPC ........................................ 399/122, 320, 322
See application file for complete search history.

(56) References Cited

U.S. PATENT DOCUMENTS

2017/0023893 A1 1/2017 Himeno
2018/0067453 A1 3/2018 Himeno

FOREIGN PATENT DOCUMENTS

JP 2011016658 * 1/2011
JP 2016177085 * 10/2016
JP 2017-024843 A 2/2017

* cited by examiner

*Primary Examiner* — Hoan H Tran
(74) *Attorney, Agent, or Firm* — ScienBiziP, P.C.

(57) ABSTRACT

A transport roller pair including: a first-side roller provided with a plurality of roller portions spaced apart in a rotation axial line direction; a fixing device; and an image forming device is provided. The first-side roller includes roller portions. The transport roller pair further includes a second-side roller including a plurality of contact areas and a plurality of non-contact areas as areas other than the plurality of contact areas. At least the contact areas are covered with a release layer, and an outer diameter of each of the plurality of non-contact areas is smaller than an outer diameter of each of the plurality of contact areas. The second-side roller includes a shaft member integrally formed to have a stepped shape.

8 Claims, 12 Drawing Sheets

TRANSPORT ROLLER PAIR, FIXING DEVICE, AND IMAGE FORMING DEVICE

TECHNICAL FIELD

The disclosure relates to a transport roller pair, a fixing device, and an image forming device such as a copying machine, a multifunction machine, a printer, or a facsimile machine.

BACKGROUND ART

Some fixing devices and image forming devices include a transport roller pair provided downstream, in a transport direction of a sheet, of a fixing member used for heat-fixing an unfixed toner image to the sheet, for example.

FIG. 8 is a perspective view illustrating a known transport roller pair 17X provided downstream, in a transport direction H of a sheet P, of a fixing member used for heat-fixing an unfixed toner image to the sheet P. FIG. 9 is an enlarged cross-sectional view of portions of a first-side roller 18 and a second-side roller 19X of the known transport roller pair 17X.

As illustrated in FIG. 8, the known transport roller pair 17X may include, on one side, the first-side (driving-side) roller 18 including a plurality of roller portions 181 to 181 spaced apart on a shaft member 18*e* in a rotation axial line direction N, and, on another side, the second-side (driven-side) roller 19X opposing the first-side roller 18. The second-side roller 19X may have an outer diameter that is constant or substantially constant at least across an entire sheet transport region 19*f* in the rotation axial line direction N, and a front surface of the second-side roller 19X may be covered with a release layer 19*a* made of a release material (typically, a release layer made of a fluororesin material) to prevent fusion of toner.

FIG. 10A is a cross-sectional view illustrating a state in which, in the known transport roller pair 17X, water droplets W developed on a non-contact area 19*d* of the second-side roller 19X are about to adhere to the sheet P. FIG. 10B is a cross-sectional view illustrating a water contact angle θ of the water droplet W in a non-contact region 19*b* on the second-side roller 19X of the known transport roller pair 17X.

The release layer 19*a* formed on the front surface of the second-side roller 19X is water repellent, resulting in a large water contact angle θ (refer to FIG. 10B) (90 degrees or greater, for example) compared to a case in which the release layer 19*a* is not provided. As a result, a disadvantage arises that, when water vapor generated from the sheet P having passed through the fixing member condenses on the front surface (release layer 19*a*) of the second-side roller 19X, the water droplets W adhered to the non-contact regions 19*b* to 19*b* of the second-side roller 19X grow (refer to FIG. 10A) and adhere to the transported sheet P.

This is particularly prominent in a case in which the transport roller pair 17X is the first to transport the sheet P after the fixing and/or in a case in which the transport roller pair 17X is provided above the fixing member (more specifically, at an upward position from the sheet P that passed through the fixing member, within a distance readily affected by water vapor).

To deal with this, a transport roller in the related art is known to include a shaft member made of a metal, a plurality of large-diameter portions each having an outer diameter larger than that of the shaft member, and a plurality of small-diameter portions each having an outer diameter larger than that of the shaft member and smaller than that of the large-diameter portion. The large-diameter portions are made of a fluororesin and the small-diameter portions are made of polyacetal.

SUMMARY

Technical Problem

However, in a configuration in the related art, cylindrical components of the large-diameter portions and the small-diameter portions are fitted to the shaft member as components separate from the shaft member, making the configuration complex and making it difficult to impart strength to the small-diameter portions in manufacturing.

It is therefore an object of the disclosure to provide a transport roller pair provided downstream, in a transport direction of a sheet, of a fixing member used for heat-fixing an unfixed toner image to the sheet, in which the transport roller pair includes, on one side, a first-side roller including a plurality of roller portions spaced apart in a rotation axial line direction, thereby making it possible to suppress disadvantages associated with adhesion of water droplets to the sheet due to condensation on a second-side roller, on another side, and easily manufacture the second-side roller without making a configuration of the second-side roller complex; a fixing device; and an image forming device.

Solution to Problem

To solve the problem described above, a transport roller pair, a fixing device, and an image forming device are provided as follows.

(1) Transport Roller Pair

A transport roller pair according to the disclosure is provided downstream, in a transport direction of a sheet, of a fixing member that heat-fixes an unfixed toner image to the sheet. The transport roller pair includes, on one side, a first-side roller including a plurality of roller portions spaced apart in a rotation axial line direction of the first-side roller, and, on another side, a second-side roller including a plurality of contact areas, each including a contact region in contact with each of the plurality of roller portions of the first-side roller, and a non-contact area as an area other than the plurality of contact areas. At least the plurality of contact areas of the second-side roller are covered with a release layer made of a release material, and an outer diameter of the non-contact area is smaller than an outer diameter of each of the plurality of contact areas. The second-side roller includes a shaft member integrally formed to have a stepped shape.

(2) Fixing Device

A fixing device according to the disclosure includes the transport roller pair according to the disclosure described above.

(3) Image Forming Device

An image forming device according to the disclosure includes the transport roller pair according to the disclosure described above and the fixing device according to the disclosure described above.

Advantage Effects of Disclosure

According to the disclosure, a transport roller pair includes, on one side, a first-side roller including a plurality of roller portions spaced apart in a rotation axial line direction, thereby making it possible to suppress disadvantages associated with adhesion of water droplets to a sheet due to condensation on a second-side roller, on another side, simplify a configuration of the second-side roller, and easily manufacture the second-side roller.

DESCRIPTION OF EMBODIMENTS

An embodiment according to the disclosure will be described below with reference to the drawings. In the following description, the same components are denoted by the same reference signs. The names and functions of the components are also the same. Accordingly, detailed descriptions are not repeated.

Image Forming Device

Figure 1:
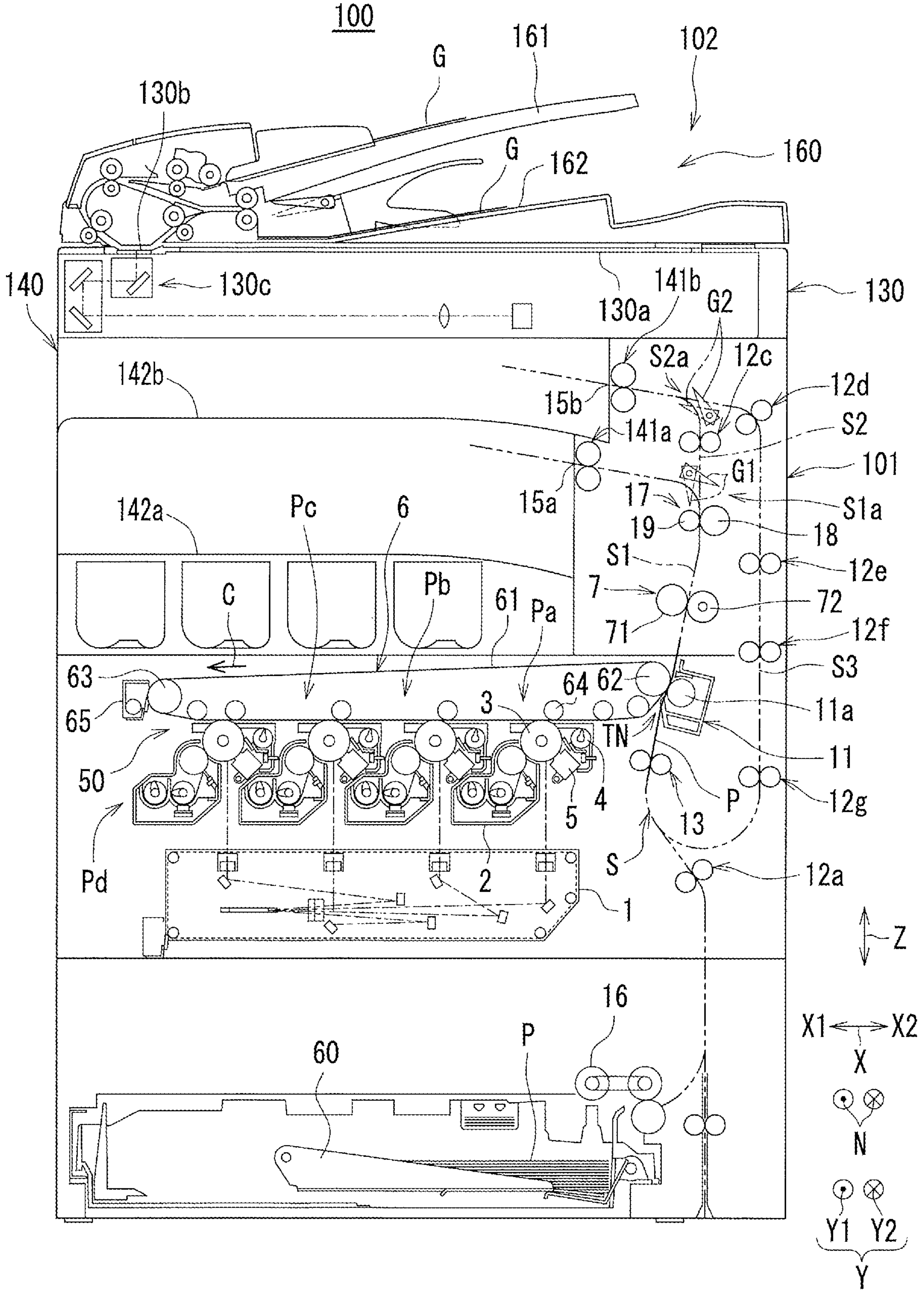
FIG. 1 is a cross-sectional view illustrating a schematic configuration of an image forming device according to an embodiment.

FIG. 1 is a cross-sectional view illustrating a schematic configuration of an image forming device 100 according to the present embodiment. In FIG. 1, reference sign X indicates a left-right direction as viewed from the front of the image forming device 100, and reference signs X1, X2 indicate a left side (first side) and a right side (second side), respectively. Reference sign Y indicates a depth direction orthogonal to the left-right direction X, and reference signs Y1, Y2 indicate a front side (first side, operation side) and a back side (second side), respectively. Reference sign Z indicates a vertical direction (up-down direction).

As illustrated in FIG. 1, the image forming device 100 is a multi-function machine including an image scanning device 102, and has a copy function, a scanner function, a facsimile function, and a printer function. The image forming device 100 transmits an image of a document G scanned by the image scanning device 102 to an external device. On a sheet P, which is a recording medium, the image forming device 100 forms, in color or in monochrome, an image of the document G scanned by the image scanning device 102 or an image received from an external device. The image forming device 100 may be a monochromatic image forming device. Further, the image forming device 100 may be a chromatic image forming device of another form.

A document feeding device 160 (automatic document feeding device) supported in an openable/closable manner with respect to an image scanner 130 is provided above the image scanner 130. The image scanning device 102 scans the document G transported by the document feeding device 160. The document feeding device 160 includes a document placement tray 161 on which the document G is placed and a document discharge tray 162 in which the documents G having been discharged are stacked. The document feeding device 160 sequentially transports one or a plurality of the documents G placed on the document placement tray 161 one by one onto the document scanner 130*b* of the image scanner 130, and discharges the documents G onto the document discharge tray 162. The image scanner 130 includes a document table 130*a* on which the document G is loaded. The image scanning device 102 scans the document G placed on the document table 130*a*. In the image forming device 100, when the document feeding device 160 is opened, the document table 130*a* above the image scanner 130 is opened and the document G can be manually placed. The image scanner 130 scans the document G transported by the document feeding device 160 with a scanning optical system 130*c* positioned at a scanning position below the document scanner 130*b*, or uses the scanning optical system 130*c* to scan the document G placed on the document table 130*a* to generate image data.

An image forming device body 101 includes an optical scanning device 1, a development device 2, a photoreceptor drum 3, a drum cleaning device 4, a charger 5, an intermediate transfer belt device 6, a secondary transfer device 11, a fixing device 7, a sheet transport path S, a feed cassette 60, and a discharger 140. The sheet transport path S includes a first sheet transport path S1, a second sheet transport path S2, and a reverse sheet transport path S3.

The image forming device 100 handles image data corresponding to a color image composed of the colors black (K), cyan (C), magenta (M), and yellow (Y), or a monochrome image composed of a single color (black, for example). An image former 50 of the image forming device 100 is provided with four sets of the development device 2, four sets of the photoreceptor drum 3, four sets of the drum cleaning device 4, and four sets of the charger 5 that form four types of toner images, with the sets respectively serving as image stations Pa, Pb, Pc, Pd corresponding to the colors black, cyan, magenta, and yellow, respectively.

The charger 5 uniformly charges a front surface of the photoreceptor drum 3 to a predetermined potential. The optical scanning device 1 exposes the front surface of the photoreceptor drum 3 to form an electrostatic latent image. The development device 2 develops the electrostatic latent image on the front surface of the photoreceptor drum 3 to form a toner image on the front surface of the photoreceptor drum 3. The drum cleaning device 4 removes and collects residual toner on the front surface of the photoreceptor drum 3. With this series of operations, a toner image of each color is formed on the front surface of each photoreceptor drum 3.

The intermediate transfer belt device 6 includes an intermediate transfer belt 61 having an endless shape, an intermediate transfer driving roller 62, an intermediate transfer driven roller 63, an intermediate transfer roller 64, and a cleaning device 65. Four of the intermediate transfer rollers 64 are provided on an inner side of the intermediate transfer belt 61, allowing four types of toner images corresponding to the respective colors to be formed on the intermediate transfer belt 61. The intermediate transfer rollers 64 transfer the toner images of the respective colors formed on the front surfaces of the photoreceptor drums 3 to the intermediate transfer belt 61 that rotates in a rotation direction C.

The intermediate transfer belt 61 is stretched over the intermediate transfer driving roller 62 and the intermediate transfer driven roller 63. In the image forming device 100, the toner images of the respective colors formed on the front surfaces of the respective photoreceptor drums 3 are sequentially transferred and superimposed on the front surface of the intermediate transfer belt 61 to form color toner images on the front surface of the intermediate transfer belt 61.

In the secondary transfer device 11, a transfer nip TN is formed between a secondary transfer roller 11*a* and the intermediate transfer belt 61, and the sheet P transported along the first sheet transport path S1 is transported while being nipped at the transfer nip TN. When the sheet P passes through the transfer nip TN, the toner image on the front surface of the intermediate transfer belt 61 is transferred by the secondary transfer device 11 onto the sheet P. Then, the sheet P is transported to the fixing device 7. The cleaning device 65 removes and collects waste toner that did not transfer to the sheet P and remains on the front surface of the intermediate transfer belt 61.

The fixing device 7 fixes the unfixed toner image to the sheet P, and includes a fixing belt 71 and a pressure roller 72 that function as a fixing member. The fixing belt 71, together with the pressure roller 72, thermally presses the toner image transferred to the sheet P onto the sheet P, thereby fixing the toner image to the sheet P. Note that, although not illustrated in FIG. 1, the fixing device 7 includes components other than the fixing belt 71 and the pressure roller 72. Details of the fixing device 7 will be described below.

The feed cassette 60 is a cassette for storing the sheets P to be used for image formation, and is provided below the optical scanning device 1. Note that, although this example illustrates a configuration in which one feed cassette 60 is provided, no such limitation is intended. A configuration with a plurality of the feed cassettes 60 may be used, with different feed cassettes 60 being loaded with different types of the sheets P.

A pickup roller 16 is provided in the vicinity of the sheet supply side of the feed cassette 60. The pickup roller 16 pulls out the sheets P one by one from the feed cassette 60 and supplies the sheets P to the first sheet transport path S1. The sheet P transported to the first sheet transport path S1 is transported toward the discharger 140 via the secondary transfer device 11 and the fixing device 7.

In this example, in the discharger 140, a plurality of discharge roller pairs (141*a*, 141*b*) are arranged in parallel in the up-down direction Z, and a plurality of sheet discharge trays (142*a*, 142*b*) respectively corresponding to the plurality of discharge roller pairs (141*a*, 141*b*) are arranged in parallel in the up-down direction Z. The plurality of discharge roller pairs (141*a*, 141*b*) discharge the sheets P toward the plurality of sheet discharge trays (142*a*, 142*b*).

Specifically, the pickup roller 16, a plurality of (two in this example) transport roller pairs 12*a*, 17, a registration roller pair 13, the intermediate transfer belt 61, the secondary transfer roller 11*a*, and the fixing belt 71 as well as the pressure roller 72 of the fixing device 7 are disposed in the vicinity of the first sheet transport path S1. The second sheet transport path S2 is in communication with an upper portion of the first sheet transport path S1. A transport roller pair 12*c* and the second discharge roller pair 141*b* are disposed in the vicinity of the second sheet transport path S2. The second discharge roller pair 141*b* is provided above the first discharge roller pair 141*a*. The second sheet discharge tray 142*b* is provided above the first sheet discharge tray 142*a*.

In the vicinity of a first branch Sla between the first sheet transport path S1 and the second sheet transport path S2, a first branching claw G1 is provided. The first branching claw G1 can be switched between a first switching orientation (orientation indicated by a solid line in FIG. 1) and a second switching orientation (orientation indicated by an imaginary line in FIG. 1). The first branching claw G1, when set in the first switching orientation, guides the sheet P transported from the fixing device 7 by the transport roller pair 17 to the first discharge roller pair 141*a*. Further, the first branching claw G1, when set in the second switching orientation, guides the sheet P transported from the fixing device 7 by the transport roller pair 17 to the second sheet transport path S2.

The image forming device body 101 includes the reverse sheet transport path S3 that guides the sheet P from a second branch S2*a* in the middle of the second sheet transport path S2 to upstream of the registration roller pair 13 of the first sheet transport path S1, reversing a front side and a back side of the sheet P.

In the vicinity of the reverse sheet transport path S3, a plurality of (four in this example) reverse transport rollers 12*d* to 12*g* are arranged. In the vicinity of the second branch S2*a* between the second sheet transport path S2 and the reverse sheet transport path S3, a second branching claw G2 is provided. The second branching claw G2 can be switched between a first switching orientation (orientation indicated by a solid line in FIG. 1) and a second switching orientation (orientation indicated by an imaginary line in FIG. 1). The second branching claw G2, when set in the first switching orientation, guides the sheet P transported from the first branch S1*a* by the transport roller pair 12*c* to the second discharge roller pair 141*b*. Further, the second branching claw G2, when set in the second switching orientation, guides the sheet P switched back from the second discharge roller pair 141*b* to the reverse sheet transport path S3.

The transport roller pairs 12*a*, 17, 12*c* and the reverse transport rollers 12*d* to 12*g* are small rollers used for promoting and assisting transport of the sheet P, and are respectively provided along the first sheet transport path S1, the second sheet transport path S2, and the reverse sheet transport path S3.

Further, the registration roller pair 13 temporarily stops the sheet P and aligns a leading end of the sheet P. The registration roller pair 13 transport the temporarily stopped sheet P in synchronization with the timing of the toner image on the intermediate transfer belt 61.

In the image forming device 100 configured as described above, when the sheet P is discharged to the first sheet discharge tray 142*a*, the first branching claw G1 is switched to the first switching orientation and the first discharge roller pair 141*a* is rotated in a discharge direction. Thus, the sheet P transported to the first sheet transport path S1 can be discharged to the first sheet discharge tray 142*a* via a sheet exit 15*a*.

When the sheet P is discharged to the second sheet discharge tray 142*b*, the first branching claw G1 is switched to the second switching orientation, the second branching claw G2 is switched to the first switching orientation, and the second discharge roller pair 141*b* is rotated in the discharge direction. Thus, the sheet P transported to the second sheet transport path S2 via the first sheet transport path S1 can be discharged to the second sheet discharge tray 142*b* via a sheet exit 15*b*.

Further, when an image is formed not only on the front side but also on the back side of the sheet P (double-sided printing), the second discharge roller pair 141*b* is rotated in the discharge direction to temporarily cause the sheet P to protrude from the sheet exit 15*b* by a predetermined distance, and then the second branching claw G2 is switched to the second switching orientation and the second discharge roller pair 141*b* is rotated in a direction opposite to the discharge direction. This makes it possible to reverse (switch back) the sheet P transported in the reverse direction to transport the sheet P to the reverse sheet transport path S3, reverse the front side and the back side of the sheet P and guide the sheet P to the registration roller pair 13 again, form an image on the back side in the same manner as on the front side, and transport the sheet P to the first sheet discharge tray 142*a* or the second sheet discharge tray 142*b*.

Fixing Device

Figure 2:
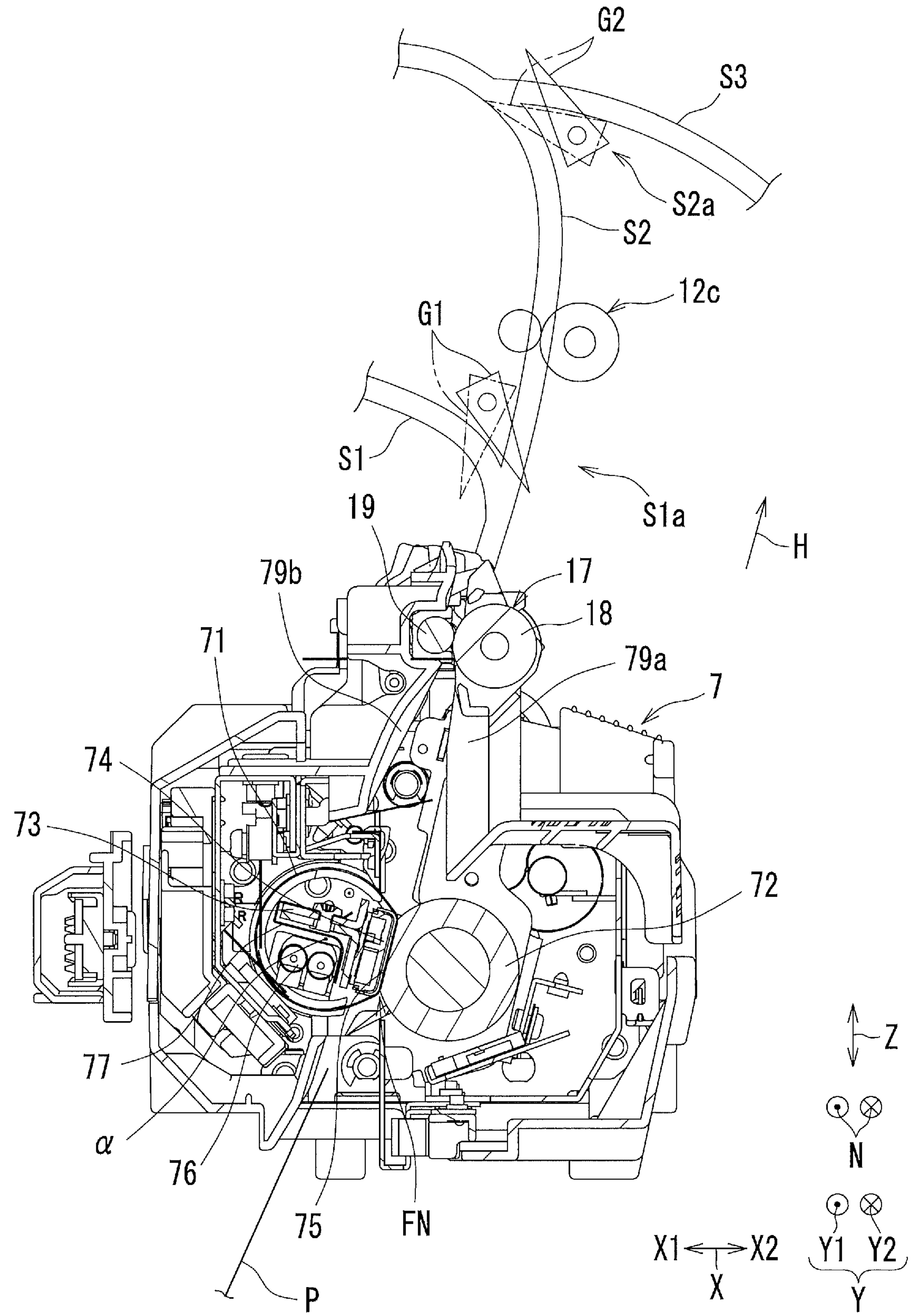
FIG. 2 is a cross-sectional view of a fixing device of the image forming device illustrated in FIG. 1.

FIG. 2 is a cross-sectional view of the fixing device 7 of the image forming device 100 illustrated in FIG. 1.

The fixing device 7 further includes a support member 73 provided on an inner side of the fixing belt 71, a fixing pad 74, a sliding sheet 75, a heat source 76, and a reflective plate 77. The fixing belt 71 is an endless flexible belt that is formed into a belt shape. The fixing belt 71 is rotatably provided about a rotation axial line α in an orthogonal direction orthogonal to the transport direction H of the sheet P. The sliding sheet 75 is provided between the fixing pad 74 and the fixing belt 71. The support member 73 is a member that supports the fixing pad 74 while pressing the sliding sheet 75 against an inner peripheral surface of the fixing belt 71. The reflective plate 77 is provided on a surface of the support member 73 on the heat source 76 side. The heat source 76 is a member used for heating the fixing belt 71 and may be, for example, a lamp heater such as a halogen lamp. The pressure roller 72 opposes the fixing pad 74 with the fixing belt 71 interposed therebetween, and presses the fixing belt 71 against the fixing pad 74 (sliding sheet 75) to form a fixing nip FN between the pressure roller 72 and the fixing belt 71. The pressure roller 72 transmits a rotational driving force to the fixing belt 71 via the fixing nip FN, thereby causing the fixing belt 71 to be driven to rotate.

First Embodiment

In the present embodiment, the image forming device 100 includes the transport roller pair 17 provided downstream, in the transport direction H of the sheet P, of the fixing member (in this example, the fixing belt 71 and the pressure roller 72) used for heat-fixing an unfixed toner image to the sheet P. In this example, on one side of the transport roller pair 17, the first-side roller (18) is rotationally driven.

Figure 3:
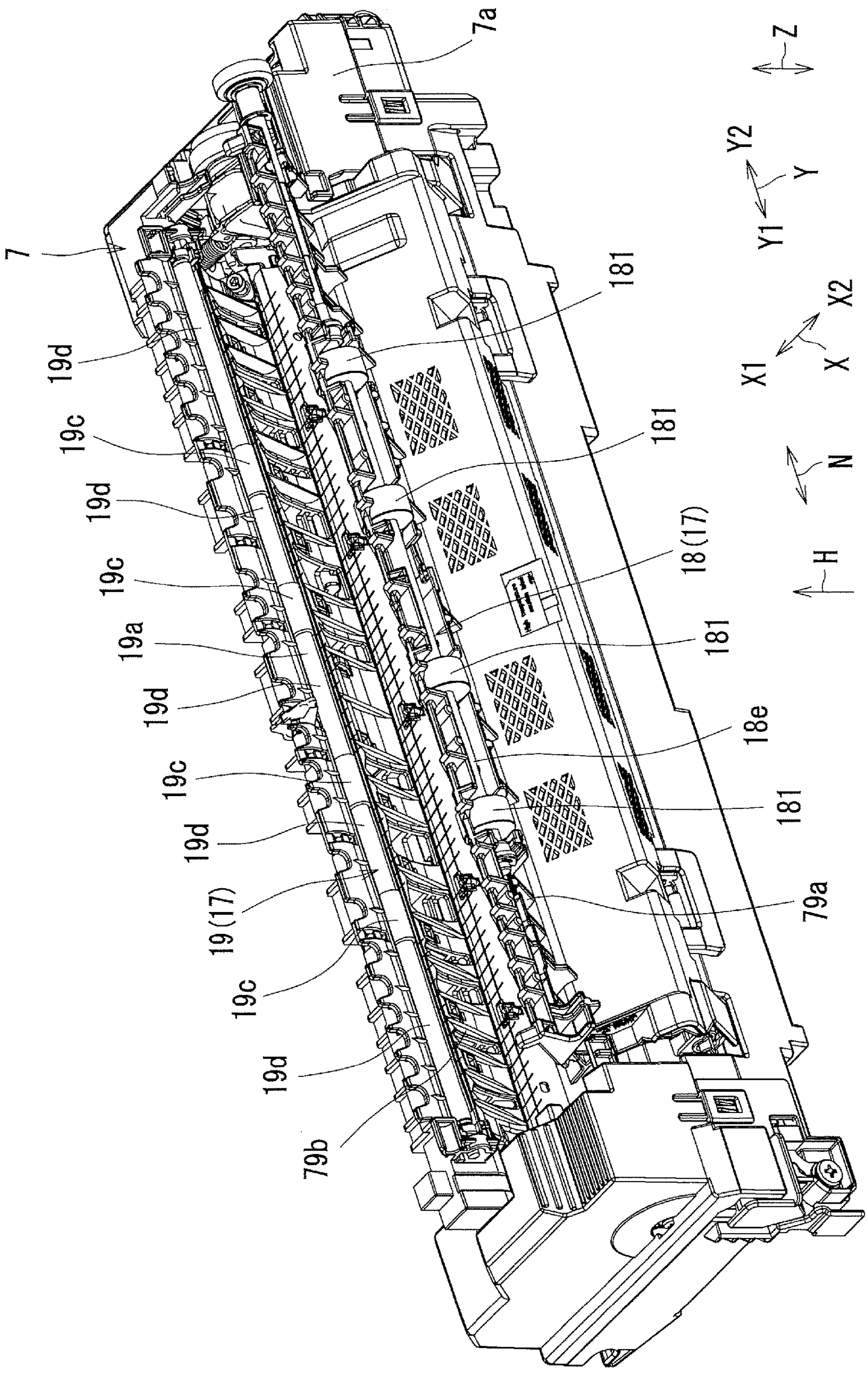
FIG. 3 is a perspective view illustrating a state in which, in the fixing device, a sheet guide member provided with a first-side roller of a transport roller pair is opened such that a second-side roller is visible.

FIG. 3 is a perspective view illustrating a state in which, in the fixing device 7, a sheet guide member 79*a* provided with the first-side roller (18) of the transport roller pair 17 is opened such that the second-side roller (19), on another side, is visible.

In this example, the transport roller pair 17 is provided in the fixing device 7, as illustrated in FIG. 3. Specifically, the transport roller pair 17 is provided in a fixing device main body 7*a* at a predetermined distance above the fixing belt 71 and the pressure roller 72, downstream of the fixing belt 71 and the pressure roller 72 in the transport direction H of the sheet P. Of the transport roller pair 17, on one side, the first-side roller is the driving-side roller 18, and, on another side, the second-side roller is the driven-side roller 19. The driving-side roller 18 is provided on the sheet guide member 79*a* supported on the fixing device main body 7*a* in a freely openable and closeable manner about an open/close axial line in the rotation axial line direction N, and the driven-side roller 19 is provided on a sheet guide member 79*b* fixed to the fixing device main body 7*a*. The driving-side roller 18 opposes the driven-side roller 19 in a state in which the sheet guide member 79*a* is held closed by the fixing device main body 7*a*.

Figure 4:
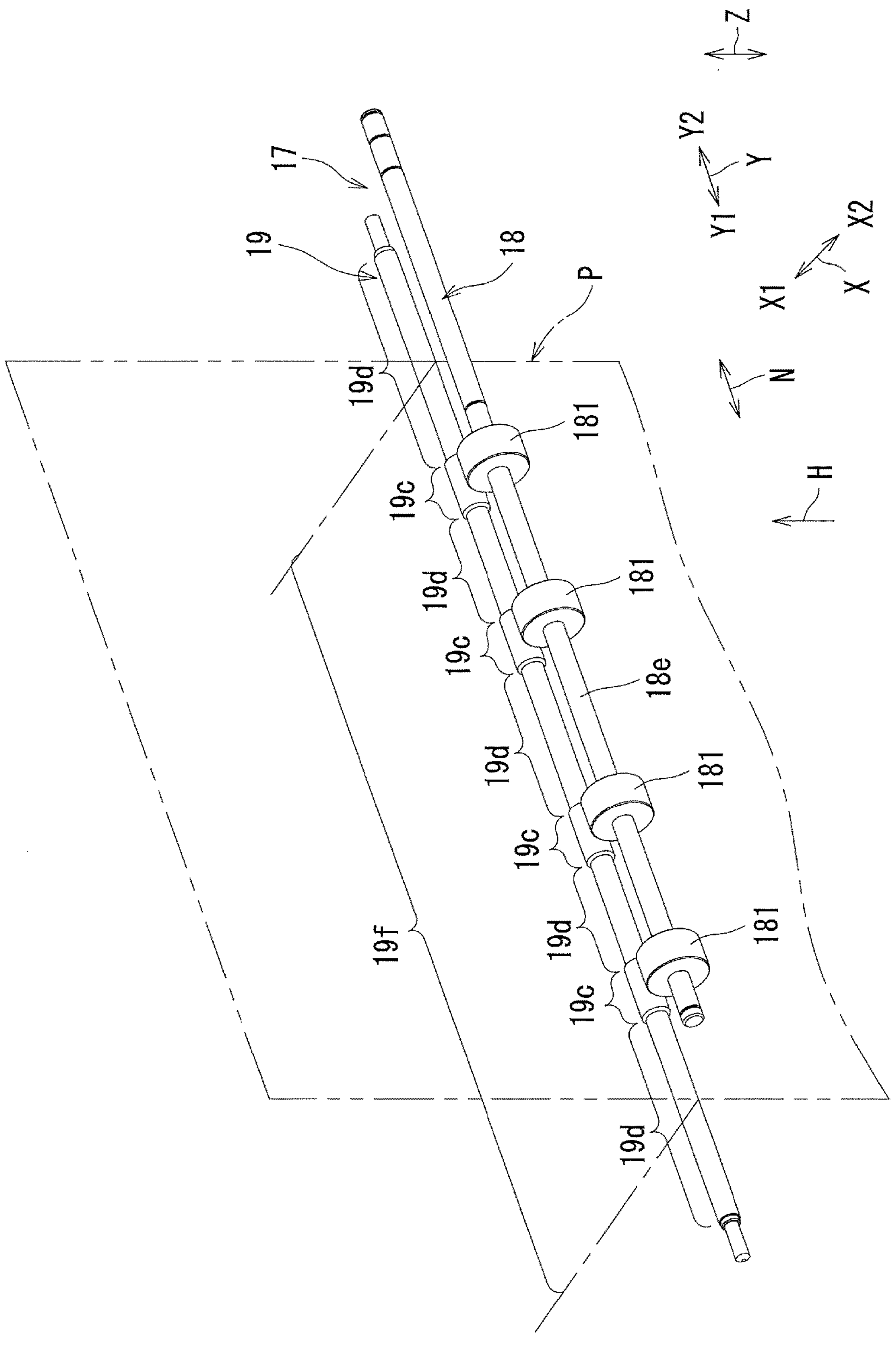
FIG. 4 is a perspective view illustrating the transport roller pair according to the embodiment.
Figure 5:
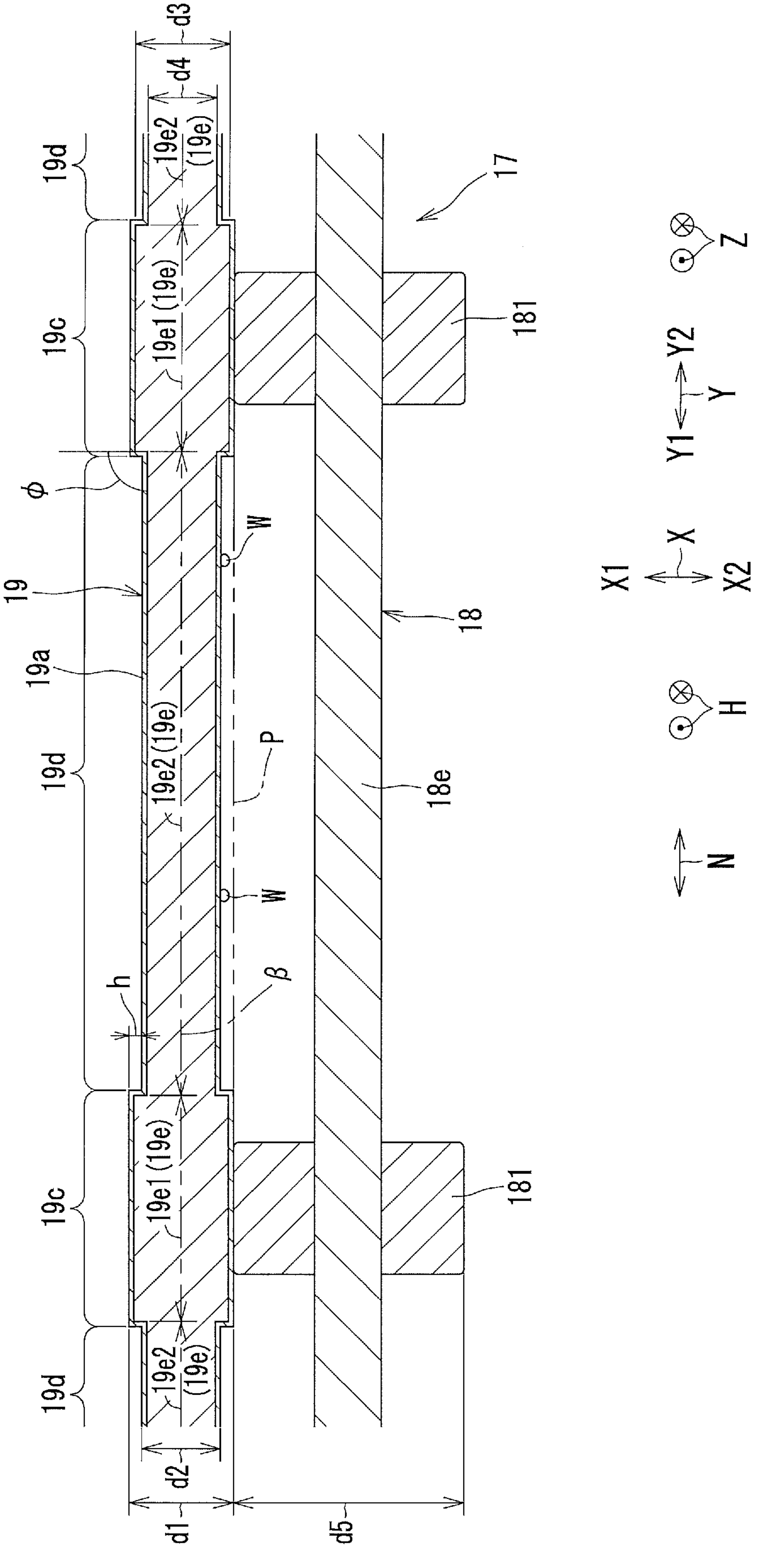
FIG. 5 is an enlarged cross-sectional view of portions of a driving-side roller and a driven-side roller of the transport roller pair according to the embodiment.

FIG. 4 is a perspective view illustrating the transport roller pair 17 according to the present embodiment. FIG. 5 is an enlarged cross-sectional view of portions of the driving-side roller 18 and the driven-side roller 19 of the transport roller pair 17 according to the present embodiment.

As illustrated in FIG. 4, the driving-side roller 18 includes the plurality of roller portions 181 to 181 spaced apart in the rotation axial line direction N. In this example, the driving-side roller 18 includes the shaft member 18*e* and the roller portions 181 to 181 each having a cylindrical shape, made of an elastic material, and fitted at the outer side of the shaft member 18*e*.

The driven-side roller 19 includes a plurality of contact areas 19*c* to 19*c* each including a contact region in contact with each of the plurality of roller portions 181 to 181 of the driving-side roller 18, and a plurality of non-contact areas 19*d* to 19*d*, which are areas other than the contact areas 19*c* to 19*c*.

As illustrated in FIG. 5, at least the contact areas 19*c* to 19*c* of the driven-side roller 19 are covered with the release layer 19*a* made of a release material, and an outer diameter d2 of each of the non-contact areas 19*d* to 19*d* is smaller than an outer diameter d1 of each of the contact areas 19*c* to 19*c*.

The driven-side roller 19 includes a shaft member 19*e* integrally formed to have a stepped shape. Specifically, the shaft member 19*e* is constituted by first shaft portions 19*e*1 to 19*e*1 respectively corresponding to the contact areas 19*c* to 19*c*, and second shaft portions 19*e*2 to 19*e*2 respectively corresponding to the non-contact areas 19*d* to 19*d*. In the shaft member 19*e*, an outer diameter d4 of each of the second shaft portions 19*e*2 to 19*e*2 is smaller than an outer diameter d3 of each of the first shaft portions 19*e*1 to 19*e*1. In the shaft member 19*e*, a step h is present between each of the first shaft portions 19*e*1 to 19*e*1 and each of the second shaft portions 19*e*2 to 19*e*2. The release layer 19*a* is formed with a uniform (constant or substantially constant) thickness. That is, the release layer 19*a* has the same or substantially the same thickness at the first shaft portions 19*e*1 to 19*e*1 and the second shaft portions 19*e*2 to 19*e*2.

According to the present embodiment, the release layer 19*a* is formed at least in the contact areas 19*c* to 19*c* of the driven-side roller 19. Thus, fusion of the toner can be effectively prevented. Further, even in a case in which water vapor generated from the sheet P passing through the fixing member (71, 72) condenses on the front surface (release layer 19*a*) of the driven-side roller 19 and the water droplets W adhered in the non-contact regions of the driven-side roller 19 grow, since the outer diameter d2 of each of the non-contact areas 19*d* to 19*d* is smaller than the outer diameter d1 of each of the contact areas 19*c* to 19*c*, disadvantages associated with adherence of the water droplets W to the sheet P due to condensation on the driven-side roller 19 can be suppressed.

This is particularly effective in a case in which, as in the present embodiment, the transport roller pair 17 is the first to transport the sheet P after the fixing and/or in a case in which the transport roller pair 17 is provided above the fixing member (71, 72) (more specifically, at an upward position from the sheet P that passed through the fixing member (71, 72), within a distance readily affected by water vapor).

In addition, since the shaft member 19*e* of the driven-side roller 19 is integrally formed to have a stepped shape, the driven-side roller 19 can be formed by forming the release layer 19*a* on the integral (single) shaft member 19*e*. Accordingly, it is not necessary to fit a component separate from the shaft member 19*e* to the shaft member 19*e*, making it possible to simplify the configuration of the driven-side roller 19 and easily manufacture the driven-side roller 19.

In the image forming device 100 including the plurality of sheet exits (15*a*, 15*b*) in the up-down direction Z such as in the present embodiment, from the viewpoint of accommodating the sheet P having a small size such as a postcard-size sheet or an A6 size sheet, the transport roller pair 17 that initially transports the sheet P after the fixing is easily provided between the fixing member (71, 72) and the first discharge roller pair 141*a*. In this case, the transport roller pair 17 is easily provided above the fixing member (71, 72) (more specifically, at an upward position from the sheet P that passed through the fixing member (71, 72), within a distance readily affected by water vapor).

Accordingly, as in the present embodiment, in a case in which the driven-side roller 19 is applied to the image forming device 100 including the plurality of sheet exits (15*a*, 15*b*) in the up-down direction Z, it is particularly effective to provide the transport roller pair 17 downstream of the fixing member (71, 72).

In the present embodiment, the driving-side roller 18 is disposed such that the driving-side roller 18 abuts against the side of the sheet P on which an image is not formed during single-sided printing (during single-sided image formation).

With the driving-side roller 18 abutting against the side of the sheet P on which an image is not formed during single-sided printing, when double-sided printing (double-sided image formation) is performed on the side (back side) opposite to the image formation side of the sheet P, even if the water droplets W adhered to the image formation side of the sheet P during single-sided printing, the image formation side of the sheet P can be made the side on which water droplets do not adhere during double-sided printing (side opposite to the image formation side during single-sided printing). This can decrease the likelihood of transfer failure due to the water droplets W adhering to the sheet P, and thus effectively prevent the occurrence of image defects.

Examples of an elastic material constituting the roller portion 181 of the driving-side roller 18 include an ethylene propylene diene monomer (EPDM), chloroprene rubber (CR), urethane rubber, and butadiene rubber. EDPM is used in this example.

Examples of the shaft members 18*e*, 19*e* of the driving-side roller 18 and the driven-side roller 19 include shaft members having rigidity, typically, metal shaft members made of a metal material. Metal shaft members are used for both in this example. However, the shaft member is not limited thereto, and may be made of a resin material having rigidity.

In this example, in the driven-side roller 19, the release layer 19*a* is formed across at least the entire sheet transport region 19*f* (refer to FIG. 4). Here, the sheet transport region 19*f* is a region corresponding to a width of the transported sheet P (sheet of the largest size when a plurality of sizes exist) in the rotation axial line direction N. With this configuration, fusion of the toner can be reliably prevented.

Examples of the release material constituting the release layer 19*a* formed on the driven-side roller 19 typically include a fluororesin. Examples of the fluororesin include tetrafluoroethylene-perfluoroalkyl vinyl ether copolymers (PFA), polytetrafluoroethylene (PTFE), tetrafluoroethylene-hexafluoropropylene copolymers (FEP), polyvinylidene fluoride (PVDF), polychlorotrifluoroethylene (PCTFE), chlorotrifluoroethylene-ethylene copolymers (ECTFE), and tetrafluoroethylene-ethylene copolymers (ETFE). PFA is used in this example.

In this example, in the release layer 19*a* in the contact areas 19*c* to 19*c*, a region other than the contact region with the roller portions 181 to 181 of the driving-side roller 18 is preferably minimized to the extent possible. For example, a width of this region can be set to a predetermined amount of looseness in the rotational axial line direction N of the driving-side roller 18 (a predetermined amount of movement with a margin in the rotation axial line direction N) or to a predetermined distance larger than the amount of looseness. This makes it possible to minimize the area of the region other than the contact regions with the roller portions 181 to 181 of the release layer 19*a* to the extent possible, and effectively prevent the water droplets W from adhering to the sheet P accordingly.

Second Embodiment

In the present embodiment, at least the first shaft portions **19*e*1 to 19*e*1 of the shaft member 19***e* of the driven-side roller 19 are covered with the release layer 19*a* made of a fluororesin tube. Specifically, the fluororesin tube inserted onto the shaft member 19*e* is applied by heat shrinkage.

With the shaft member 19*e* thus covered with the release layer 19*a* made of the fluororesin tube, the release layer 19*a* can be easily formed and the number of components can be reduced, making it possible to stably maintain the accuracy of the shaft member 19*e*. In this example, the step h between each of the first shaft portions **19*e*1 to 19*e*1 and second shaft portions 19*e*2 to 19*e*2 of the shaft member 19***e* is 0.5 mm or greater as one example, preferably 1.0 mm or greater. For example, in the case of being covered with a fluororesin tube, when the step h is too large, there is a risk of causing disadvantages such as air bubbles and floating of the fluororesin tube at the step h. Accordingly, as the step h, 1.0 mm or less is preferred. This makes it possible to suppress disadvantages such as air bubbles and floating of the fluororesin tube at the step h.

Third Embodiment

In the present embodiment, at least the first shaft portions **19*e*1 to 19*e*1 of the shaft member 19***e* of the driven-side roller 19 are coated with the release layer 19*a* made of a fluororesin material. Specifically, a coating film made of a fluororesin material applied to the shaft member 19*e* is applied by surface treatment.

With the shaft member 19*e* coated with the release layer 19*a* made of the fluororesin material, the release layer 19*a* can be easily formed and the number of components can be reduced, making it possible to stably maintain the accuracy of the shaft member 19*e*.

Fourth Embodiment

In the first to third embodiments, an angle φ (refer to FIG. 5) of the step h with respect to a rotation axial line β is a right angle. In this case, disadvantages such as air bubbles and floating of the fluororesin tube at the step h are likely to occur. To deal with this, the fourth embodiment is configured as follows.

Figure 6A:
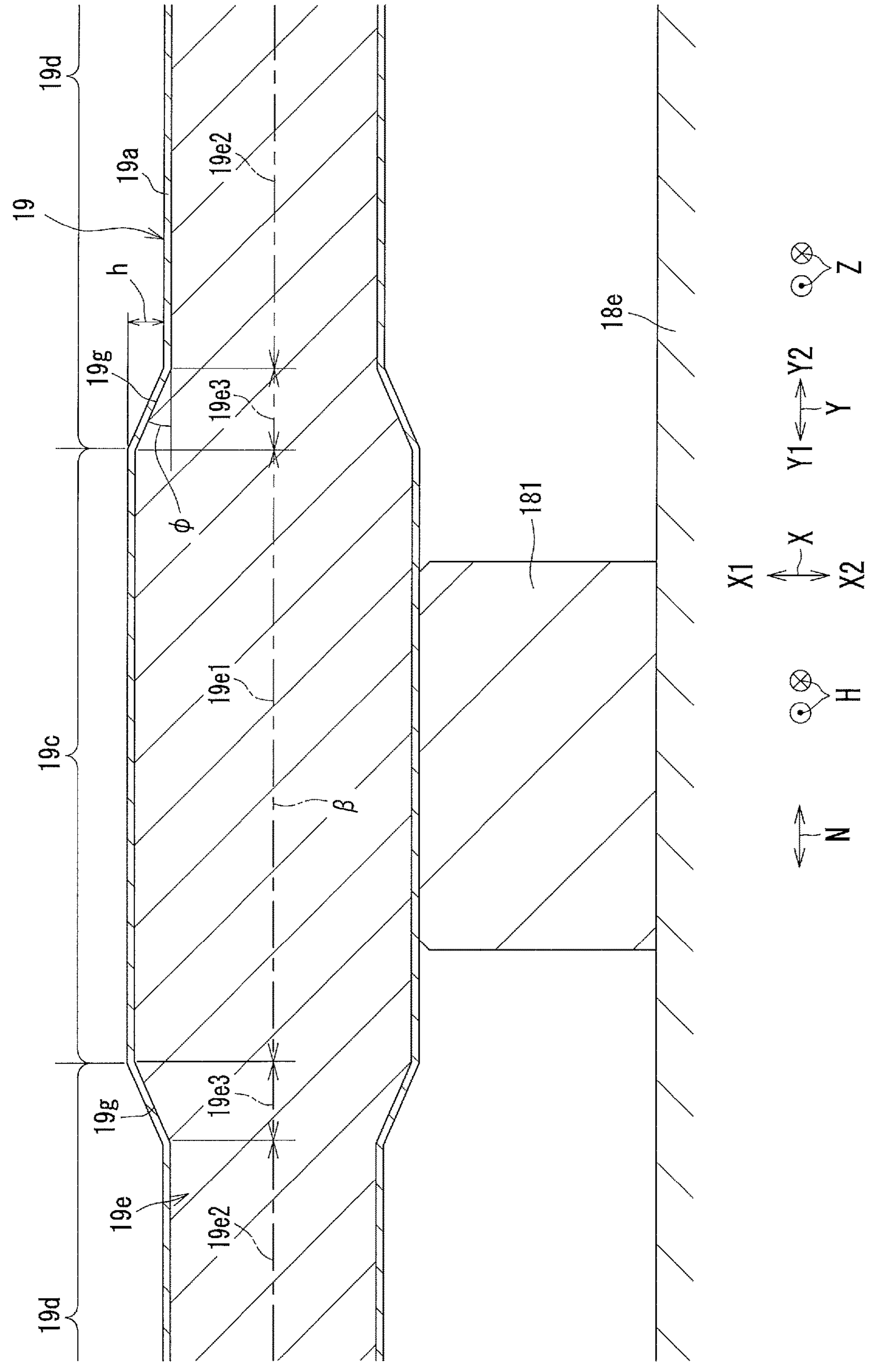
FIG. 6A is an enlarged cross-sectional view illustrating an example in which a first shaft portion and second shaft portions are connected by inclined areas each including an inclined surface.
Figure 6B:
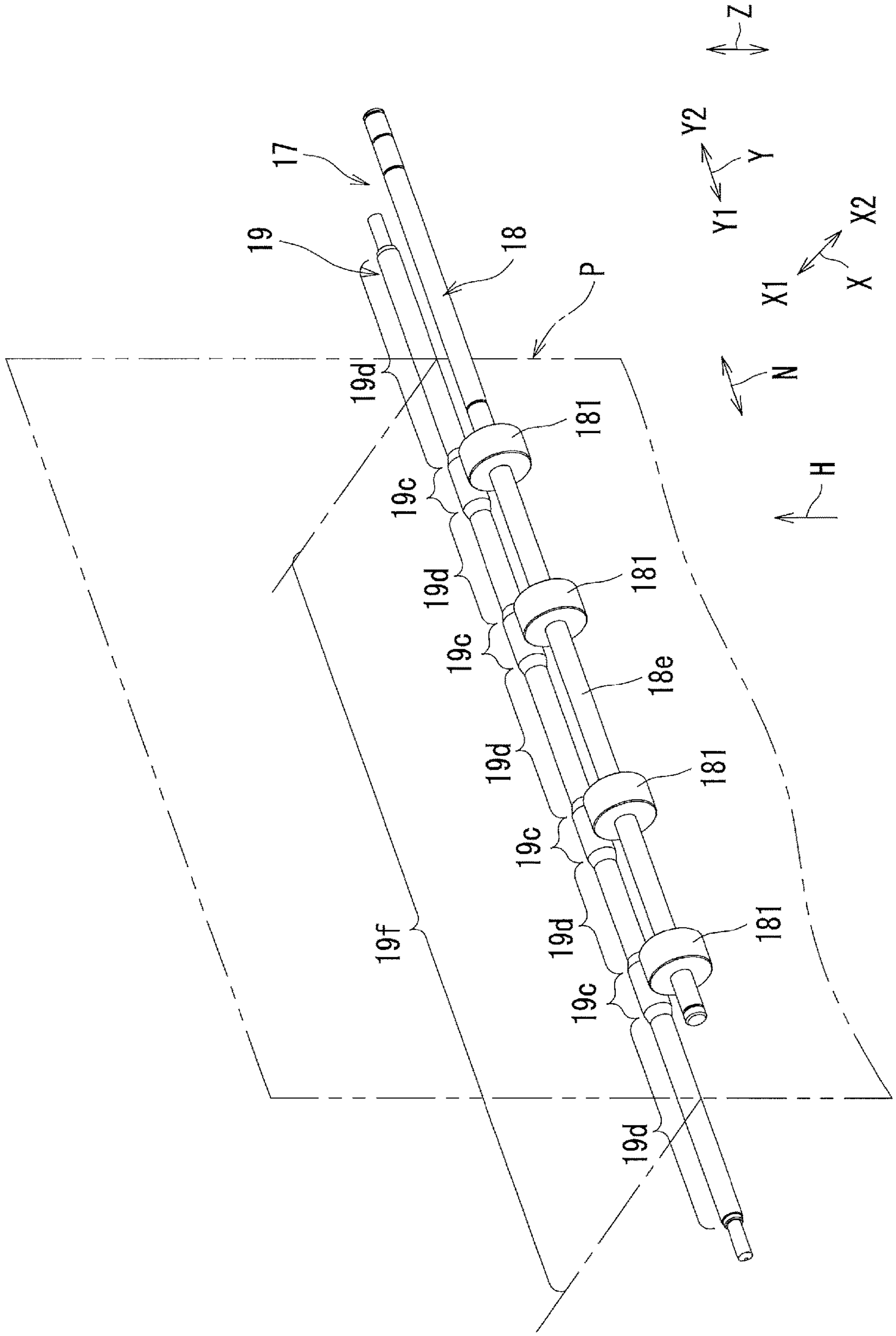
FIG. 6B is a perspective view illustrating the transport roller pair constituted by a driving-side roller and a driven-side roller including the inclined areas illustrated in FIG. 6A.

FIG. 6A is an enlarged cross-sectional view illustrating an example in which the first shaft portions 19*e*1 to 19*e*1 and the second shaft portions 19*e*2 to 19*e*2 are connected by inclined areas 19*e*3 to 19*e*3 each including an inclined surface 19*g*. FIG. 6B is a perspective view illustrating the transport roller pair 17 constituted by the driving-side roller 18 and the driven-side roller 19 that includes the inclined areas 19*e*3 to 19*e*3 illustrated in FIG. 6A. In the present embodiment, in the driven-side roller 19, the first shaft portions 19*e*1 to 19*e*1 and the second shaft portions 19*e*2 to 19*e*2 of the shaft member 19*e* are connected to each other by the inclined areas 19*e*3 to 19*e*3 each including the inclined surface 19*g* in a cross-sectional view.

This makes it possible to make the step h between each of the first shaft portions 19*e*1 to 19*e*1 and each of the second shaft portions 19*e*2 to 19*e*2 gentle (for example, an angle φ of the step h is 30 degrees or less, in this example, about 25 degrees), and thus easily form the release layer 19*a* on the step h. For example, when the shaft member 19*e* is covered with a fluororesin tube, it is possible to suppress disadvantages such as air bubbles and floating of the fluororesin tube at the step h. Here, when the angle φ of the step h is too small, it is difficult to ensure the length of the second shaft portion 19*e*2 in the rotation axial line direction N. From this viewpoint, the angle φ of the step h is preferably 10 degrees or greater.

Fifth Embodiment

In the fourth embodiment, in the driven-side roller 19, the portion between the inclined surface 19*g* of the shaft member 19*e* and the outer peripheral surface of the first shaft portion 19*e*1 as well as the portion between the inclined surface 19*g* and the outer peripheral surface of the second shaft portion 19*e*2 are formed into a bent shape. However, the portions between the inclined surface 19*g* and the outer peripheral surface of the first shaft portion 19*e*1 as well as the portion between the inclined surface 19*g* and the outer peripheral surface of the second shaft portion 19*e*2 may be formed into a curved shape (rounded).

Figure 7A:
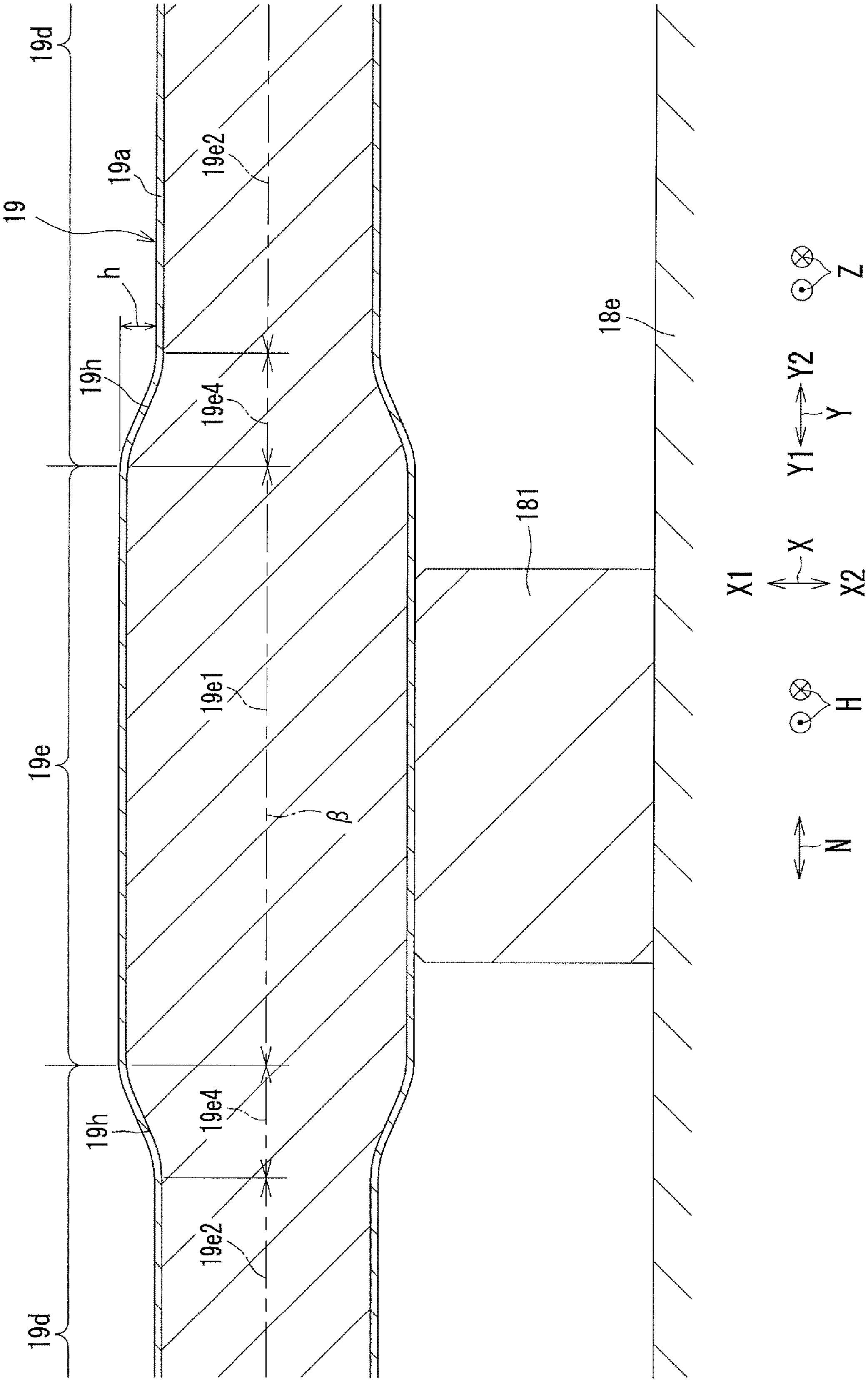
FIG. 7A is an enlarged cross-sectional view illustrating an example in which the first shaft portion and the second shaft portions are connected by curved areas each including a curved surface.
Figure 7B:
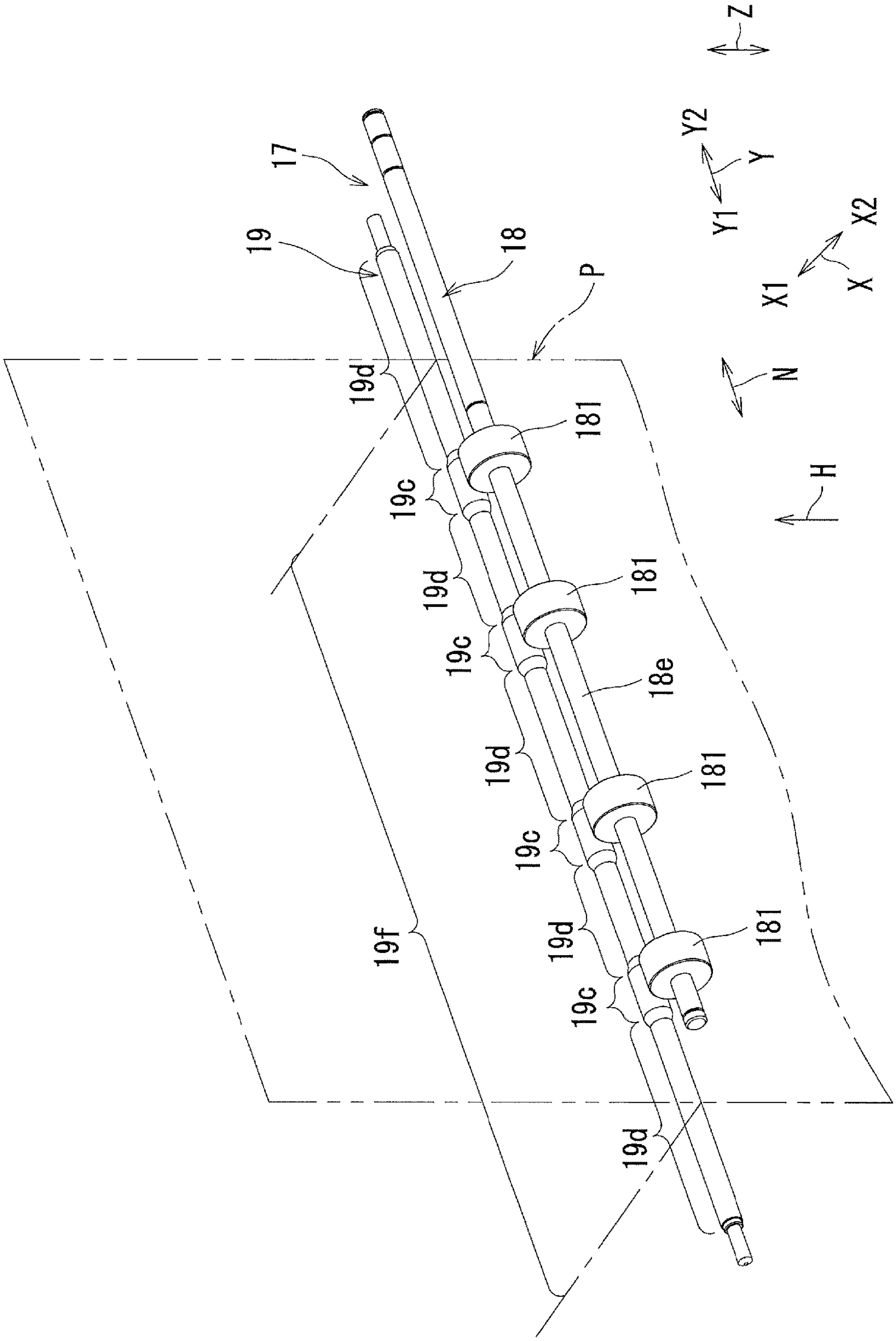
FIG. 7B is a perspective view illustrating the transport roller pair constituted by the driving-side roller and the driven-side roller including the curved areas illustrated in FIG. 7A.
Figure 8:
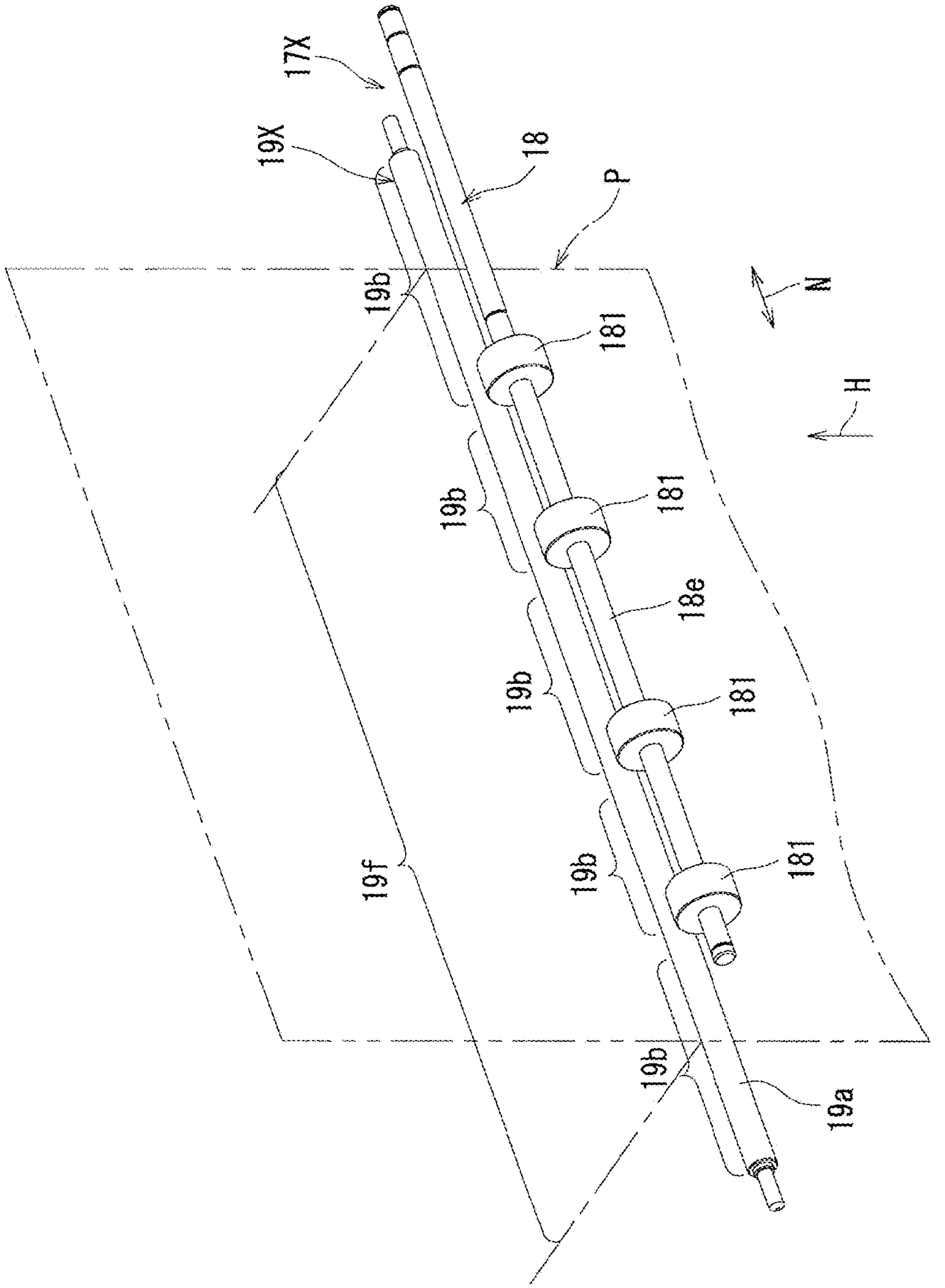
FIG. 8 (Prior Art)
FIG. 8 is a perspective view illustrating a known transport roller pair provided downstream, in a transport direction of a sheet, of a fixing member used for heat-fixing an unfixed toner image to the sheet.
Figure 9:
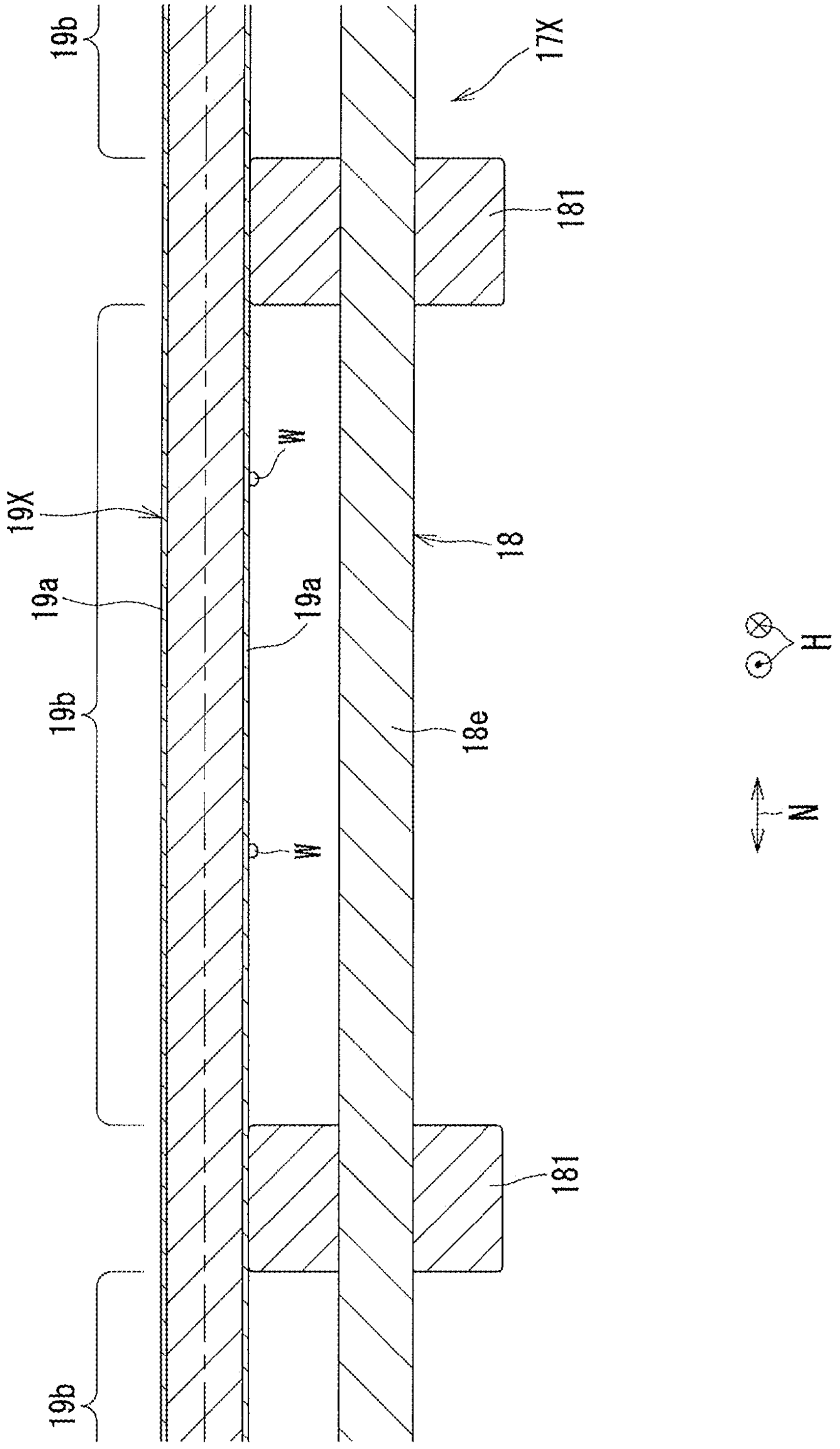
FIG. 9 (Prior Art)
FIG. 9 is an enlarged cross-sectional view of portions of a first-side roller and a second-side roller of the known transport roller pair.
Figure 10A:
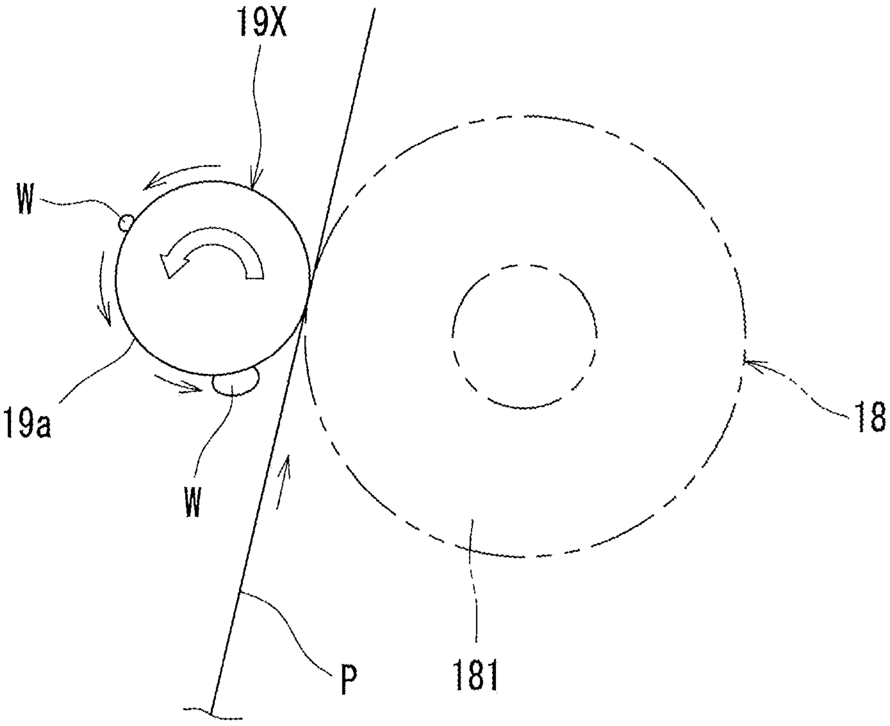
FIG. 10A (Prior Art)
FIG. 10A is a cross-sectional view illustrating a state in which, in the known transport roller pair, water droplets developed on a non-contact area of the second-side roller are about to be adhered to the sheet.
Figure 10B:
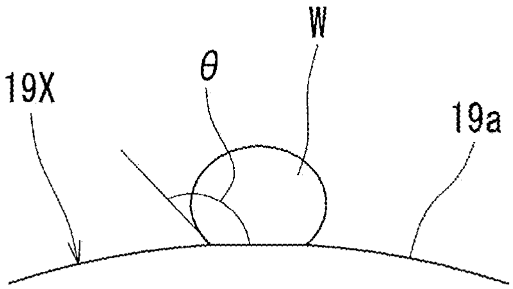
FIG. 10B (Prior Art)
FIG. 10B is a cross-sectional view illustrating a water contact angle of the water droplet in a non-contact region on the second-side roller of the known transport roller pair.

FIG. 7A is an enlarged cross-sectional view illustrating an example in which the first shaft portions 19*e*1 to 19*e*1 and the second shaft portions 19*e*2 to 19*e*2 are connected by curved areas 19*e*4 to 19*e*4 each including a curved surface 19*h*. FIG. 7B is a perspective view illustrating the transport roller pair 17 constituted by the driving-side roller 18 and the driven-side roller 19 including the curved areas 19*e*4 to 19*e*4 illustrated in FIG. 7A.

In the present embodiment, in the driven-side roller 19, the first shaft portions 19*e*1 to 19*e*1 and the second shaft portions 19*e*2 to 19*e*2 of the shaft member 19*e* are connected by the curved areas 19*e*4 to 19*e*4 each including the curved surface 19*h* in a cross-sectional view. Specifically, the curved surface 19*h* is formed into a convex curved surface shape at an end on the first shaft portion 19*e*1 side, and into a concave curved surface shape at an end on the second shaft portion 19*e*2 side.

This makes it possible to make the step h between the first shaft portions 19*e*1 to 19*e*1 and the second shaft portions 19*e*2 to 19*e*2 gentle (gradually change the outer diameter), and thus easily form the release layer 19*a* on the step h. For example, when the shaft member 19*e* is covered with a fluororesin tube, it is possible to suppress disadvantages such as air bubbles and floating of the fluororesin tube at the step h.

Sixth Embodiment

In the present embodiment, in the transport roller pair 17, an outer diameter d5 (refer to FIG. 5) of each of the roller portions 181 to 181 of the driving-side roller 18 is different from the outer diameter d1 (refer to FIG. 5) of each of the contact areas 19*c* to 19*c* of the driven-side roller 19. In this example, the outer diameter d1 of each of the contact areas 19*c* to 19*c* is smaller than the outer diameter d5 of the roller portion 181 of the driving-side roller 18. This makes it possible to reliably correct a curled state of the sheet P toward the roller 18 side having a small diameter (in this example, the driven side).

Note that, in the first to sixth embodiments, the release layer 19*a* is formed across the entire sheet transport region 19*f* on the front side of the driven-side roller 19. However, the release layer 19*a* may be formed on the contact areas 19*c* to 19*c* only.

In the first to sixth embodiments, the transport roller pair 17 is provided in the fixing device 7, but the transport roller pair 17 may be provided in the image forming device body 101.

In the first to sixth embodiments, the fixing device 7 includes the heat source 76 in the fixing belt 71. However, the fixing belt may be wound around a heating roller, or a heat-fixing roller may be provided instead of the fixing belt. In this case, the heat-fixing roller acts as the fixing member.

The disclosure is not limited to the embodiments described above and can be implemented in various other forms. Thus, the above embodiments are merely examples in all respects and should not be interpreted as limiting. The scope of the disclosure is indicated by the claims and is not limited to the description. Furthermore, all modifications and changes equivalent in scope with the claims are included in the scope of the disclosure.

REFERENCE SIGNS LIST

100 Image forming device
101 Image forming device body
140 Discharger
141*a* First discharge roller pair
141*b* Second discharge roller pair
142*a* First sheet discharge tray
142*b* Second sheet discharge tray
15*a* Sheet exit
15*b* Sheet exit
17 Transport roller pair
18 Driving-side roller (first-side roller)
181 Roller portion
18*e* Shaft member
19 Driven-side roller (second-side roller)
19*a* Release layer
19*b* Non-contact region

19*c* Contact area
19*d* Non-contact area
19*e* Shaft member
19*e*1 First shaft portion
19*e*2 Second shaft portion
19*e*3 Inclined area
19*e*4 Curved area
19*f* Sheet transport region
19*g* Inclined surface
19*h* Curved surface
7 Fixing device
71 Fixing belt
72 Pressure roller
76 Heat source
7*a* Fixing device main body
H Transport direction
N Rotation axial line direction
P Sheet
S Sheet transport path
S1 First sheet transport path
S1*a* First branch
S2 Second sheet transport path
S2*a* Second branch
S3 Reverse sheet transport path
TN Transfer nip
W Water droplet
X Left-right direction
Y Depth direction
Z Up-down direction
d1 Outer diameter
d2 Outer diameter
d3 Outer diameter
d4 Outer diameter
d5 Outer diameter
h Step
α Rotation axial line
β Rotation axial line
θ Water contact angle
φ Angle

The invention claimed is:

1. A transport roller pair provided downstream, in a transport direction of a sheet, of a fixing member that heat-fixes an unfixed toner image to the sheet, the transport roller pair comprising:

on one side, a first-side roller including a plurality of roller portions spaced apart in a rotation axial line direction of the first-side roller, and on another side, a second-side roller including a plurality of contact areas, each including a contact region in contact with each of the plurality of roller portions of the first-side roller, and a non-contact area as an area other than from the plurality of contact areas, wherein at least the plurality of contact areas of the second-side roller are covered with a release layer made of a release material, and an outer diameter of the non-contact area is smaller than an outer diameter of each of the plurality of contact areas, and the second-side roller includes a shaft member integrally formed to have a stepped shape.

2. The transport roller pair according to claim 1, wherein the second-side roller is covered with the release layer made of a fluororesin tube at at least a first shaft portion of the shaft member, the first shaft portion corresponding to each of the plurality of contact areas.

3. The transport roller pair according to claim 1, wherein the second-side roller is coated with the release layer made of a fluororesin material at at least a first shaft portion of the shaft member, the first shaft portion corresponding to each of the plurality of contact areas.

4. The transport roller pair according to claim 1, wherein the second-side roller is continuously connected between a first shaft portion corresponding to each of the plurality of contact areas and a second shaft portion corresponding to each of the non-contact area of the shaft member by an inclined area including an inclined surface in a cross-sectional view.

5. The transport roller pair according to claim 4, wherein the second-side roller is formed into a curved shape between the inclined surface of the shaft member and an outer peripheral surface of the first shaft portion as well as an outer peripheral surface of the second shaft portion.

6. The transport roller pair according to claim 1, wherein an outer diameter of each of the plurality of roller portions of the first-side roller and an outer diameter of each of the plurality of contact areas of the second-side roller of the transport roller pair differ from each other.

7. A fixing device comprising:

the transport roller pair according to claim 1.

8. An image forming device comprising:

the transport roller pair according to claim 1.

* * * * *